United States Patent
Kandiyanallur (10) Patent No.: US 9,223,690 B2
(45) Date of Patent: Dec. 29, 2015

(54) FREEING MEMORY SAFELY WITH LOW PERFORMANCE OVERHEAD IN A CONCURRENT ENVIRONMENT

(71) Applicant: Sybase, Inc., Dublin (CA)

(72) Inventor: Vivek Kandiyanallur, Bangalore (IN)

(73) Assignee: Sybase, Inc., Dublin, CA (US)

( * ) Notice: Subject to any disclaimer, the term of this patent is extended or adjusted under 35 U.S.C. 154(b) by 140 days.

(21) Appl. No.: 14/046,749

(22) Filed: Oct. 4, 2013

(65) Prior Publication Data

US 2015/0100730 A1 Apr. 9, 2015

(51) Int. Cl.
*G06F 12/02* (2006.01)
*G06F 12/12* (2006.01)

(52) U.S. Cl.
CPC .......... *G06F 12/023* (2013.01); *G06F 12/121* (2013.01)

(58) Field of Classification Search
CPC ......... G06F 12/02; G06F 3/061; G06F 3/067; G06F 12/023; G06F 12/121
USPC .................................. 711/118, 159
See application file for complete search history.

(56) References Cited

U.S. PATENT DOCUMENTS

| | | | |
|---|---|---|---|
| 5,088,036 A | 2/1992 | Ellis et al. | |
| 5,274,804 A | 12/1993 | Jackson et al. | |
| 5,485,613 A | 1/1996 | Engelstad et al. | |
| 6,047,295 A | 4/2000 | Endicott et al. | |
| 6,339,779 B1 | 1/2002 | Houldsworth | |
| 6,513,100 B1 | 1/2003 | Clift | |
| 7,133,977 B2 | 11/2006 | Pudipeddi et al. | |
| 7,441,252 B2 | 10/2008 | Li et al. | |
| 7,539,821 B2 | 5/2009 | Petev et al. | |
| 7,552,284 B2 | 6/2009 | Petev et al. | |
| 7,581,232 B2 | 8/2009 | Bernabeu-Auban et al. | |
| 7,694,065 B2 | 4/2010 | Petev et al. | |
| 7,788,300 B2 | 8/2010 | Kuck et al. | |
| 8,229,979 B2 | 7/2012 | Manolov et al. | |
| 8,266,111 B2 | 9/2012 | Lin et al. | |
| 8,838,928 B2 * | 9/2014 | Robin et al. | G06F 12/023 711/147 |
| 2007/0226281 A1* | 9/2007 | Joisha | 707/206 |
| 2010/0153617 A1* | 6/2010 | Miroshnichenko et al. | 711/6 |
| 2013/0031333 A1* | 1/2013 | Sankaran et al. | 711/207 |

* cited by examiner

*Primary Examiner* — Pierre-Michel Bataille
(74) *Attorney, Agent, or Firm* — Sterne, Kessler, Goldstein & Fox P.L.L.C.

(57) ABSTRACT

Freeing memory safely with low performance overhead in a concurrent environment is described. An example method includes creating a reference count for each sub block in a global memory block, and each global memory block includes a plurality of sub blocks aged based on respective allocation time. A reference count for a first sub block is incremented when a thread operates a collection of data items and accesses the first sub block for a first time. Reference counts for the first sub block and a second sub block are lazily updated. Subsequently, the sub blocks are scanned through in the order of their age until a sub block with a non-zero reference count is encountered. Accordingly, one or more sub blocks whose corresponding reference counts are equal to zero are freed safely and with low performance overhead.

18 Claims, 6 Drawing Sheets

FREEING MEMORY SAFELY WITH LOW PERFORMANCE OVERHEAD IN A CONCURRENT ENVIRONMENT

BACKGROUND

In a multi-threaded environment, garbage collector frequently attempts to reclaim memory occupied by objects that are no longer in use. Once an unreachable set of memory has been determined, the garbage collector may release the unreachable objects from the memory. Alternatively, it may copy some or all of the reachable objects from an aged memory into a new area of memory and update all references to those objects as needed.

To ensure that the memory block is freed safely so that an object is not reused while any thread still holds a pointer to it, some systems use a reference count to indicate how many threads or processes currently hold a reference to the object. However, such conventional reference-count manipulation mechanism may incur significant overhead and performance bottleneck. Furthermore, they do not scale well when there are highly-parallel workloads running on large multiprocessor systems. The problem is exacerbated in the environment where multiple threads concurrently read and write very large data collections from/to the memory blocks. As a result, conventional systems fail to provide an ideal reference-count mechanism for efficient memory utilization with low performance overhead and scalability.

BRIEF DESCRIPTION OF THE DRAWINGS/FIGURES

Embodiments are described, by way of example only, with reference to the accompanying drawings. In the drawings, like reference numbers generally indicate identical or functionally similar elements. The drawing in which an element first appears is typically indicated by the leftmost digit or digits in the corresponding reference number.

DETAILED DESCRIPTION

Provided herein are system, method and/or computer program product embodiments, and/or combinations and subcombinations thereof, for freeing memory safely with low performance overhead in a concurrent multi-threaded environment. As will be described in further detail below, embodiments can provide sub memory blocks which are aged based on their allocation time, so that an older sub block is allocated before a newer sub block. Embodiments can further implement a lazily updated reference count and a light weight locking mechanism to keep track of the number of threads currently referencing a sub block. Embodiments can perform a scan through the sub blocks in the order of their age to identify the sub blocks with zero reference count and abort the scan if a sub block with a non-zero reference count is encountered. Accordingly, embodiments reduce the cost in maintaining the reference counts and can free memory safely with low performance overhead.

System

Figure 1:
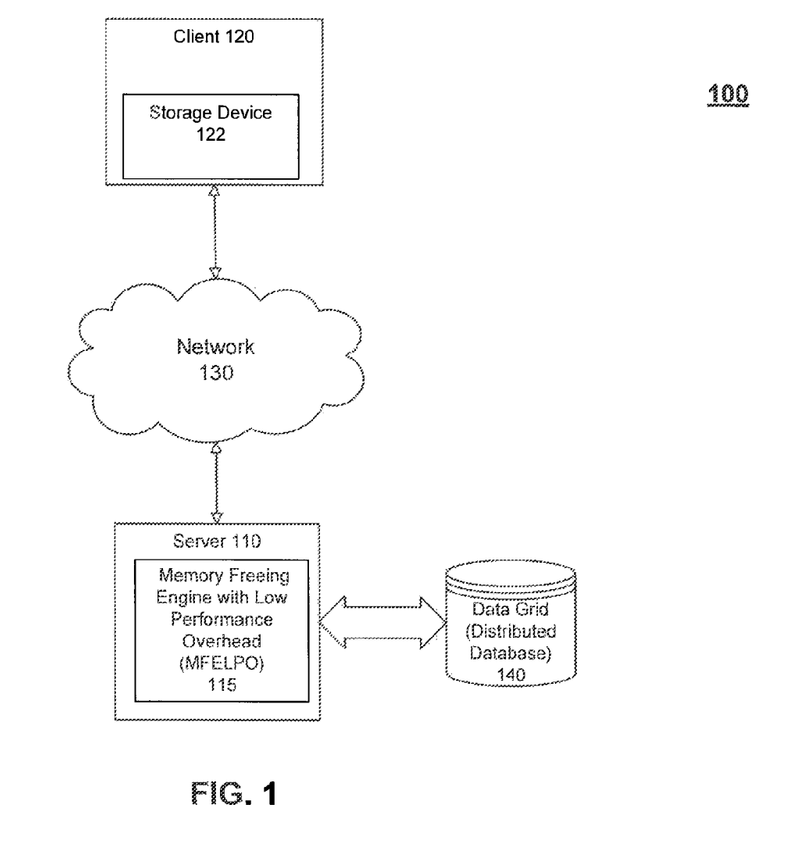
FIG. 1 illustrates a client/server system, according to an embodiment.

FIG. 1 illustrates a client/server system 100. System 100 includes a server 110, a Memory Freeing Engine with Low Performance Overhead (MFELPO) 115, a client 120, a network 130, and a data grid or distributed database 140.

Client 120 communicates with server 110 over the network 130. Specifically, client 120 may be connected to a Database Management System (DBMS) (not shown) on server 110 via network 130. In an embodiment, the DBMS such as SAPS Adaptive Server® Enterprise (ASE), SAP Sybase IQ, SAP Sybase SQL Anywhere (all from SAP AG) and operates as an independent process (i.e., independently of the clients), running under a server operating system such as Microsoft® Windows NT, Windows 2000, Windows XP, Windows Vista and Windows 7 (all from Microsoft Corporation of Redmond, Wash.), UNIX (Novell), Solaris (Sun), or Linux (Red Hat), although the invention is not limited to this example. The network 220 includes functionality for packaging client calls in the well-known Structured Query Language (SQL) together with any parameter information into a format (of one or more packets) suitable for transmission to the DBMS. Client 120 may send SQL statement to server 110 and receive query result from server 110. Although only one server 110 is shown, more servers may be used as necessary. Network 130 may be any network or combination of wired and wireless networks that carry data communication. Such network can include, but is not limited to, a local area network, medium area network, and/or wide area network such as the Internet.

Client 120 includes a storage device 122. Although only one client 120 is shown, more clients may be used as necessary. Storage device 122, an example of which will be described in detail with respect to FIG. 5, can be any device for recording and storing information, which includes but is not limited to, flash memory, magnetic tape and optical discs.

Server 110 can host Memory Freeing Engine with Low Performance Overhead (MFELPO) 115. As illustrated in FIG. 1, client 120 can send data requests to server 110, which can in turn invoke MFELPO 115 for further processing. MFELPO 115 can be software, firmware, or hardware or any combination thereof in a computing device. System 100 can be implemented on or implemented by one or more computing devices. As will be further described with respect to FIG. 5, a computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s).

Figure 2:
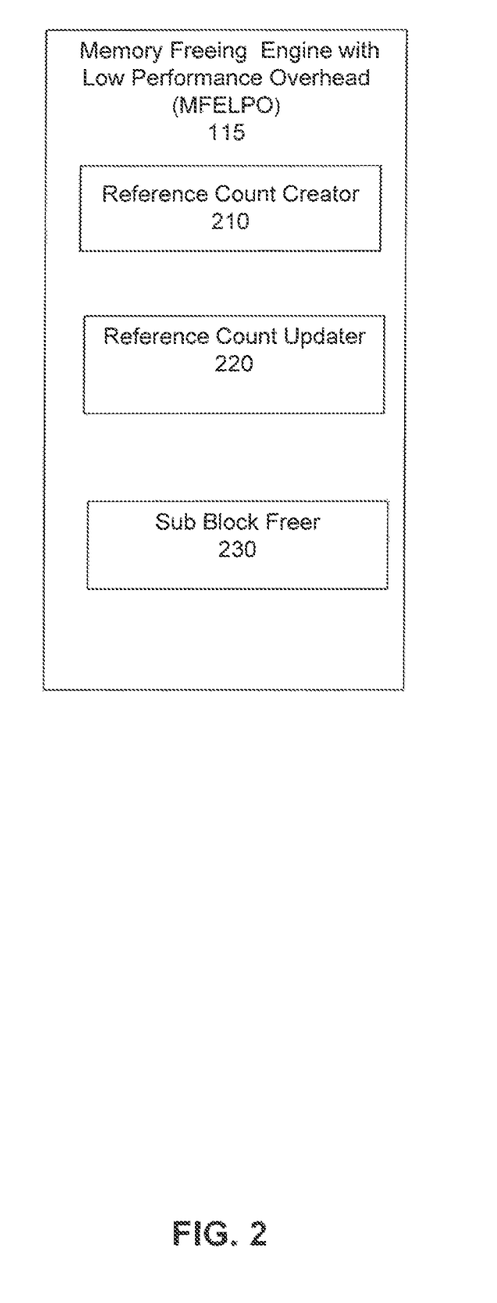
FIG. 2 illustrates elements of a Memory Freeing Engine with Low Performance Overhead (MFELPO), according to an embodiment.

FIG. 2 illustrates elements of a Low Performance Overhead Memory Freeing Engine (MFELPO), according to an embodiment. In the example shown in FIG. 2, MFELPO 115 includes reference count creator 210, reference count updater 220, and sub block freer 230.

Reference count creator 210 creates a reference count for each sub block in a global logical memory block. A logical memory structure may include multiple sub memory blocks, which are operated upon by multiple threads concurrently to read and write very large data collections from or to the sub memory blocks. For example, the concurrent threads may process "big data" which according to an embodiment may contain data sets with sizes beyond the ability of commonly used software tools to capture, curate, manage, and process the data within a tolerable elapse time. In an embodiment, big data may encompass high volume, high velocity, and/or high variety information assets that require new forms of processing to enable enhanced decision making, insight discovery and process optimization. In an embodiment, depending on the capabilities of the organization managing the data set, and on the capabilities of the applications that are used to process and analyze the data set in its domain, big data sizes may range from a few dozen terabytes to many petabytes of data in a single data set.

In one embodiment, sub memory blocks may age based on their allocation time. For example, an older sub block is allocated before a newer sub block. The sub block whose age has exceeded a threshold may need to be freed. Alternatively, sub blocks whose data has been copied to newer sub blocks may be freed. To facilitate the process of freeing the aged sub blocks for efficient memory utilization, a reference count may be generated by reference count creator 210 indicating how many threads currently hold reference to a specific sub block. A sub block may age over time and reach a state when it is no longer required. If a reference count of a sub block reaches zero, the sub block may become inaccessible, and the object in the sub block can be destroyed. Thus, a sub block may be freed when no thread is actively holding reference to it.

Reference count updater 220 increments a reference count for a first sub block when a thread operates a collection of data items and accesses the first sub block for a first time. For example, a thread may read a collection of data items from a first sub block. Alternatively, a thread may write a collection of data items into a first sub block. When a thread access the first sub block for a read or write operation, reference count updater 220 may increment the reference count for the first sub block.

Reference count updater 220 further lazily updates reference counts for the first sub block and a second sub block when the thread returns with a new collection of data items and accesses a second sub block different from the first sub block. For example, the reference count for the first sub block is decremented and the reference count for the second sub block is incremented.

A relatively simple reference count manipulating mechanism may require frequent updates so that whenever a reference to a sub block is destroyed or overwritten, the reference count of the corresponding sub block is decremented; and whenever a reference to a sub block is created or copied, the reference count of the corresponding sub block is incremented. In contrast to this simple reference counting mechanism, reference count updater 220 may take a lazy updating approach to reduce performance overhead.

According to an embodiment, a thread may cache a reference to a sub block in a local storage of a thread when the thread operates on a collection of data items and accesses the sub block for a first time. For example, when the thread operates on a collection of data items and accesses a first sub block for the first time, the thread may cache a reference to the first sub block in its local storage.

During the course of the thread processing its collection of data items, it may operate on a second sub block which is newer than the first sub block. For example, because the second sub block is allocated later than the first sub block, its age is less than that of the first sub block. In some embodiment, reference count updater 220 does not increment the reference count of the second sub block to account for the access of the second sub block by this thread at this time.

During the course of the thread processing its collection of data items, it may complete its collection of data items and leave a sub block. For example, the thread may complete a first collection of data items and leave the first sub block. In some embodiments, reference count updater 220 does not decrement the reference count of the first sub block at this time.

During the course of the thread processing its collection of data items, a thread may complete processing a first collection of data items and return with a new collection of data items. In the event that the thread accesses a second sub block which is different from the first sub block for the processing of the new collection of data items, in some embodiments, reference count updater 220 may decrement the reference count of the first sub block and increment the reference count of the second sub block.

In some embodiments, when a thread is destroyed, reference count updater 220 may decrement the reference count of the sub block which is cached in the local storage of the thread.

Rather than the frequent updates in the conventional reference counting mechanism, this delayed and lazy approach adopted by reference count updater 220 maintains the integrity of the reference count of the sub block while reduces performance overhead.

In an embodiment, sub block freer 230 frees one or more sub blocks whose corresponding reference counts are equal to zero, in the order of their age. For example, sub block freer 230 may scan through the aged sub blocks in the order of their corresponding age from the oldest sub block to the newest sub block. If the reference count is found to be zero, sub block freer 230 may free the corresponding sub block. In some embodiments, sub block freer 230 may terminate the sequential scanning process if it encounters a sub block with non-zero reference count.

Embodiments of the elements of MFELPO 115 in FIG. 2, as described herein, may be further configured to run in parallel. Such parallel execution of these elements would increase the efficiency and speed of MFELPO 115.

Method

Figure 3:
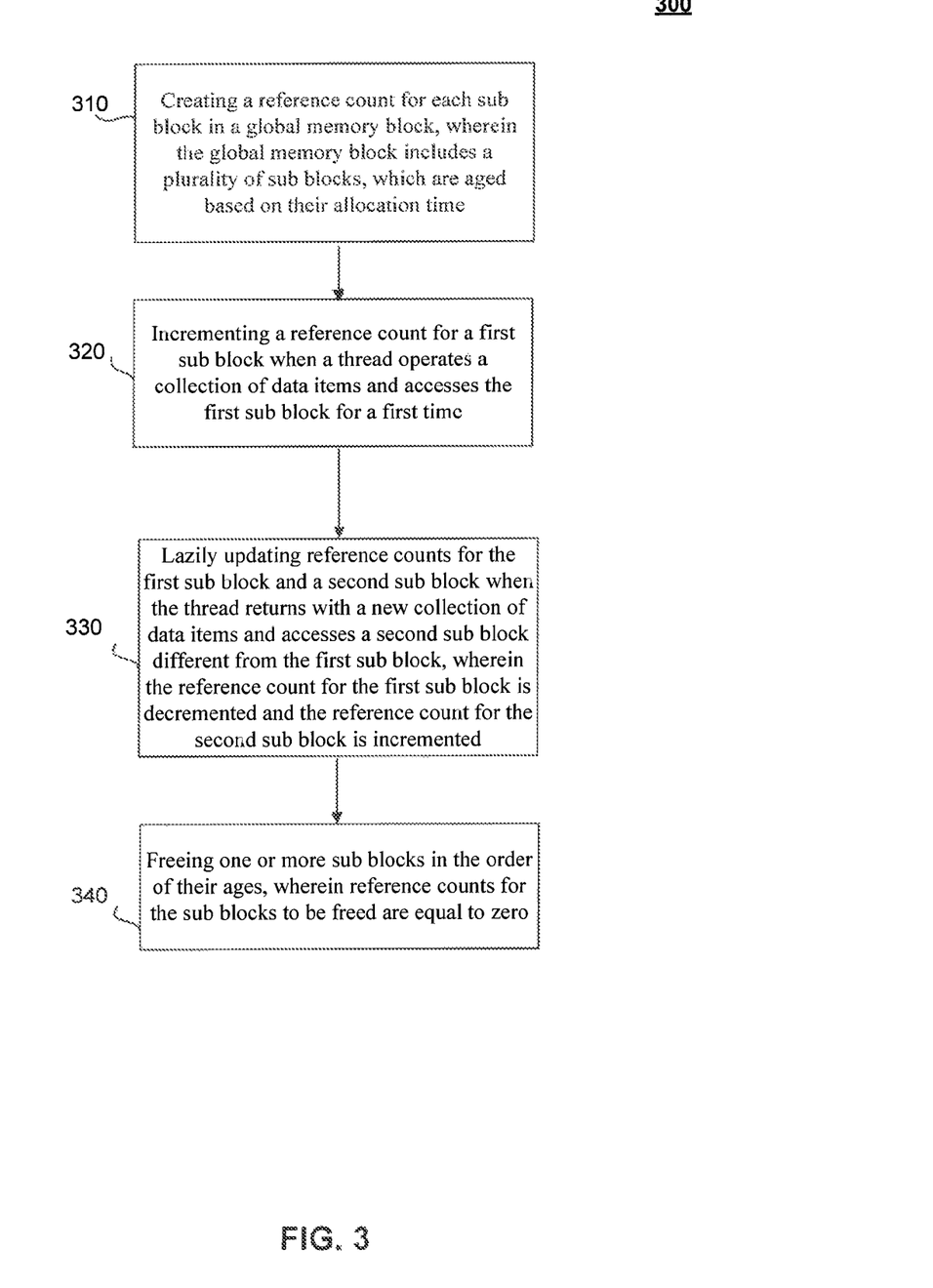
FIG. 3 is a flowchart for a method for freeing memory safely with low performance overhead, according to an embodiment.

FIG. 3 is a flowchart for a method for freeing memory safely with low performance overhead, according to an embodiment. For ease of explanation, method 300 will be described with respect to MFELPO 115 of FIG. 2, as described above. However, method 300 is not intended to be limited thereto.

At stage 310, a reference count for each sub block in a global memory block is created. The global memory block may include a plurality of sub blocks, which are aged based on their allocation time. For example, reference count creator 210 creates a reference count for each sub block in a global memory block. The sub blocks in the global memory block is further illustrated in detail in FIG. 4.

Figure 4:
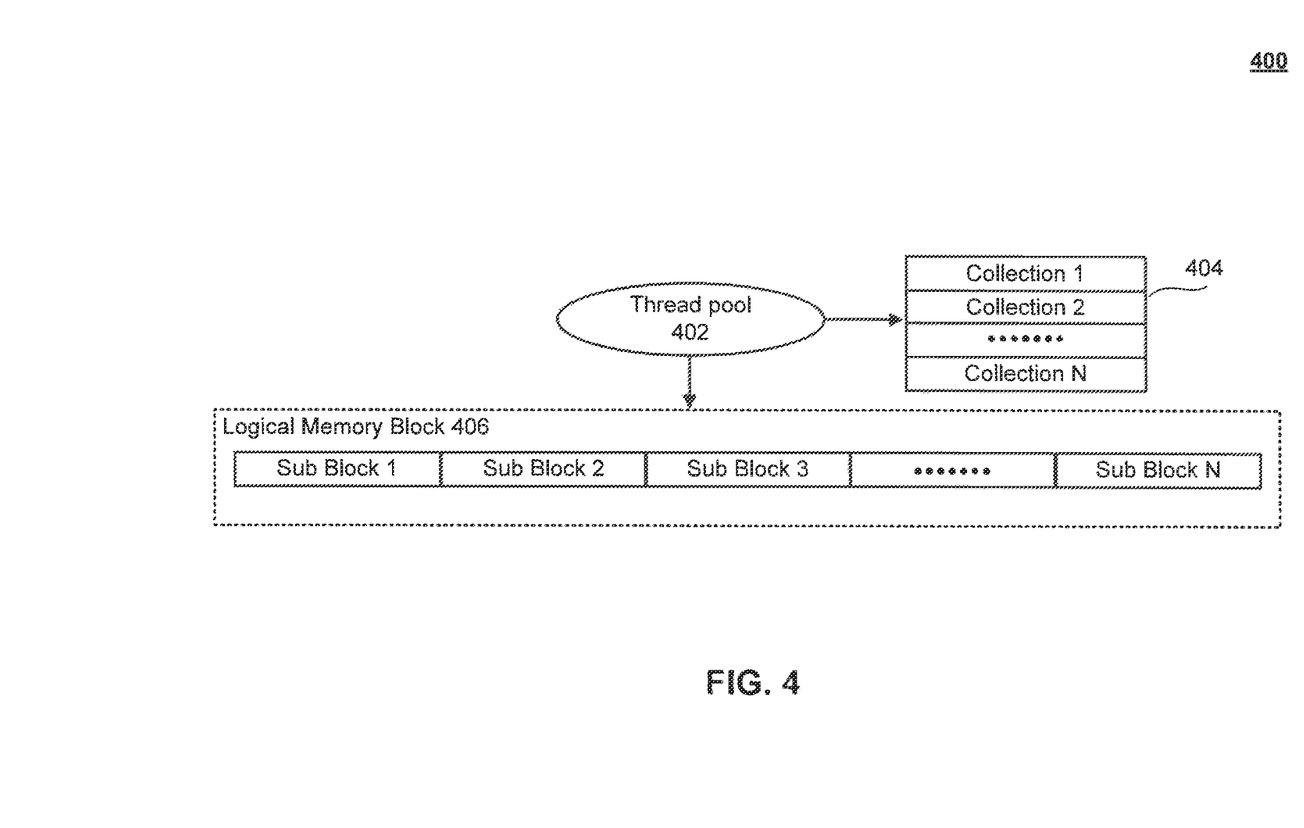
FIG. 4 depicts interaction of a thread pool with the sub blocks, according to an embodiment.

FIG. 4 depicts interaction of a thread pool with the sub blocks, according to an embodiment. In the example illustrated in FIG. 4, thread pool 402 contains a plurality of threads, which may operate on data collections 1 to N 404 to read or write on logical memory block 406. Logical memory block 406 may include a plurality of sub blocks 1-N. In an embodiment, the age of the sub block is based on the respective allocation time for each sub block. Blocks 1-N are allocated chronologically, from the oldest to the newest one. For example, sub block 1 is older than sub block 2, which is older than sub block 3 and so on.

In another embodiment, thread 1 from thread pool 402 operates on collection 1 of data items. For example, a collection may be a set of rows in database table. A collection of data items may include but is not limited to "big data" such as meteorology, genomics, connectomics, complex physics simulations, biological and environmental research data, etc. In an another example, "big data" may be collected from Internet search, finance and business informatics. In still another example, data collections may be gathered by ubiquitous information-sensing mobile devices, aerial sensory technologies (such as remote sensing), software logs, cameras, microphones, radio-frequency identification readers, and wireless sensor networks. The foregoing is provided for purposes of illustration and not limitation.

In this embodiment, thread 1 may write or read collection 1 of data items iteratively into and from sub block 1. When thread 1 completes its operation on collection 1, it may start operating on collection 2.

According to an embodiment, operation on a collection may span access to multiple sub blocks. For example, thread 1 may span access to sub blocks 1 and 2 for operating on collection 1. Sub blocks may age based on their allocation time, such that an older sub block is allocated before a newer sub block. A sub block may age over time, and can be freed when no thread actively hold reference to it.

Referring back to FIG. 3, at stage 320, a reference count for a first sub block is incremented when a thread operates a collection of data items and accesses the first sub block for a first time. For example, reference count updater 220 may increment a reference count for a first sub block when a thread operates a collection of data items and accesses the first sub block for a first time In one embodiment, when a thread starts on a collection and accesses a sub block for a first time, it may cache a reference to the sub block in its thread local storage. With the reference count created at stage 310, each sub block may maintain a record through this active reference count, indicating how many threads currently hold reference to the sub block. A non-zero value may infer that a sub block is currently referenced by one or more threads. In another embodiment, the reference count of a sub block is incremented, when a thread starts operating on a collection and accesses the sub block for a first time.

At stage 330, reference counts for the first sub block and a second sub block are lazily updated when the thread returns with a new collection of data items and accesses a second sub block different from the first sub block. In an embodiment, the reference count for the first sub block is decremented and the reference count for the second sub block is incremented. For example, reference count updater 220 lazily updates reference counts for the first and the second sub blocks.

In contrast with a conventional mechanism—where the reference count is constantly updated whenever a reference to a sub block is destroyed or overwritten, or whenever a reference to a sub block is created or copied—embodiments may take a delayed and lazy update approach to reduce performance overhead associated with maintaining the reference count.

In one embodiment, a thread operating on a collection to write or read into/from a first sub block may operate on a newer (second) sub block. For example, the age of the newer (second) sub block is lesser than that of the first sub blocks. Thus, the newer (second) sub block is allocated after the first sub block. Under such scenario, the reference count of the newer (second) sub block may not be incremented to account for the access by this thread at this time.

In another embodiment, when a thread completes its collection and leaves a sub block, for example, sub block 2, the reference count of sub block 2 is not decremented at this time.

In still another embodiment, when a thread completes it operation with collection 1 and returns with a new collection (such as collection 2), it accesses a new sub block. A determination may be made based on the reference cached on the thread's local storage. If the new sub block is different from the sub block cached, the reference count of the sub block cached is decremented and the reference count of the new sub block is incremented.

In still another embodiment, when a thread is destroyed, the reference count of the sub block cached in its local storage may be decremented.

At stage 340, one or more sub blocks whose corresponding reference counts are equal to zero, are freed in the order of their age. For example, sub block freer 230 frees one or more sub blocks whose corresponding reference counts are equal to zero in the order of their age.

In one embodiment, before a thread starts operating on its collection, it may scan through the aged sub blocks that are no longer required. For example, sub blocks whose age has exceeded a threshold may need to be freed. Alternatively, sub blocks whose data has been copied to newer sub blocks may be freed. The aged sub blocks whose reference counts are set to zero, may be freed in the order of their age, from the oldest sub block to the newest one.

In another embodiment, as the thread scans through the aged sub blocks sequentially based on their allocation time, the scan may be terminated if it encounters a sub block with a non-zero reference count. In still another embodiment, access to a sub block's specific reference count may be synchronized using a light weight lock. No two threads may access a reference count for the same sub block simultaneously. For example, if a thread finds another thread freeing the aged sub blocks; it may abort and proceed with the operation on its collection. Thus, this scanning operation may be non-blocking and protected through the light weight locking mechanism.

Figure 5:
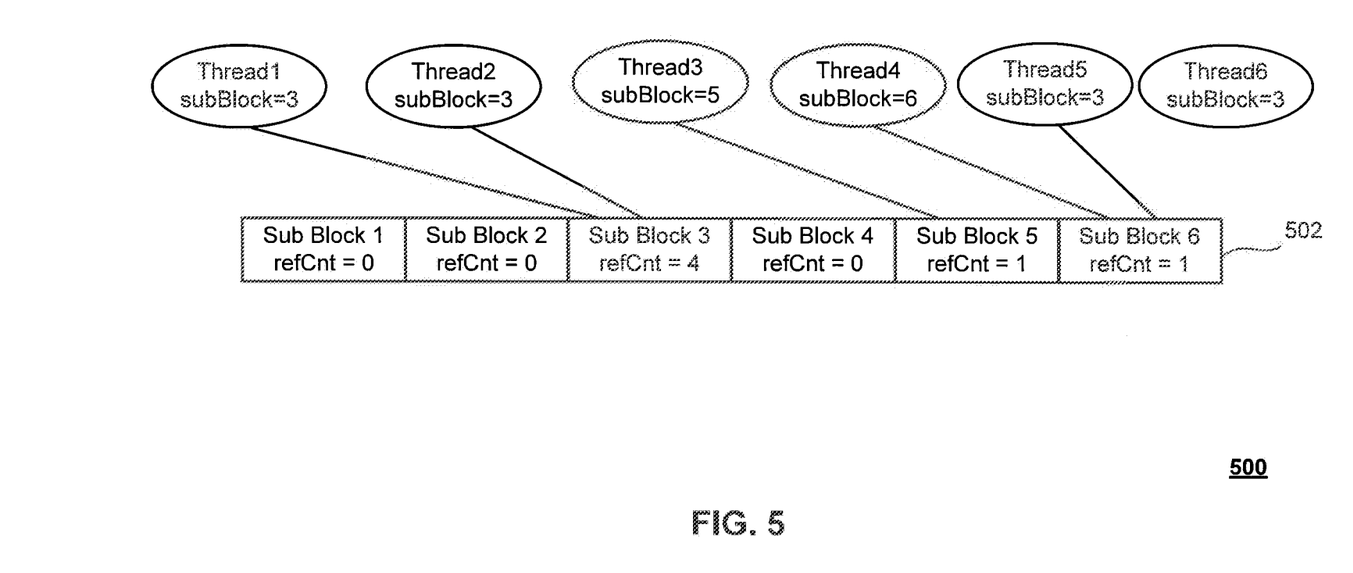
FIG. 5 depicts freeing memory safely with low performance overhead, according to an embodiment.

FIG. 5 depicts freeing memory safely with low performance overhead, according to an embodiment. In the example illustrated in FIG. 5, there are six threads—thread 1 to 6—operating on collections of data items to read or write from/into memory sub blocks 1 to 6, with sub block 1 being the oldest block and sub block 6 being the newest one in the logical memory block 502.

When a thread starts on a collection and accesses a sub block for a first time, it may cache a reference to the sub block in its thread local storage. As shown in FIG. 5, Thread 1 and 2 each caches a reference to sub block 3. Thread 3 caches a reference to sub block 5 and Thread 4 caches a reference to sub block 6. Notably, Thread 5 caches a reference to sub block 3, but currently also points to sub block 6, indicating thread 5 may span access to sub blocks 3 and 6 in operating on a specific collection of data items. Thread 6 caches a reference to sub block 3, but is not currently referencing any sub block indicating it is yet to start with a new collection of data items. For example, thread 6 may access sub block 6 for processing its next collection of data items, if sub block 3 is full.

Before a thread starts operating on a new collection, for example, thread 7 may scan through the aged sub blocks sequentially based on the allocation time and identify that sub block 1 and 2 have zero reference count. Thread 7 may terminate the scanning process when it encounters a non-zero reference count at sub block 3 and stop scanning further. Thread 7 may proceed to free sub blocks 1 and 2.

FIG. 5 also illustrates a lazily updating mechanism in maintaining the reference count for a sub block. In the example of thread 5, as noted above, thread 5 caches a reference to sub block 3, but currently also points to sub block 6, indicating thread 5 has moved over from sub block 3 to a newer sub block 6 in processing a collection of data items. In the embodiments of a delayed and lazily updating approach, when thread 5 leaves sub block 3 and moves to sub block 6, the reference count on sub block 6 is not incremented to account for the access by thread 5 at this time.

In the example of thread 6, it is waiting to start on a new collection of data items. When thread 6 completes a previous collection and leaves sub block 3, the reference count on sub block 3 is not decremented at this time. Accordingly, the lazily updated reference count, the thread local storage and light weight locking mechanism may result in safely freeing memory with less performance overhead in a multi-threaded environment.

Example Computer System Implementation

Embodiments shown in FIGS. 1-5, or any part(s) or function(s) thereof, may be implemented using hardware, software modules, firmware, tangible computer readable media having instructions stored thereon, or a combination thereof and may be implemented in one or more computer systems or other processing systems.

Figure 6:
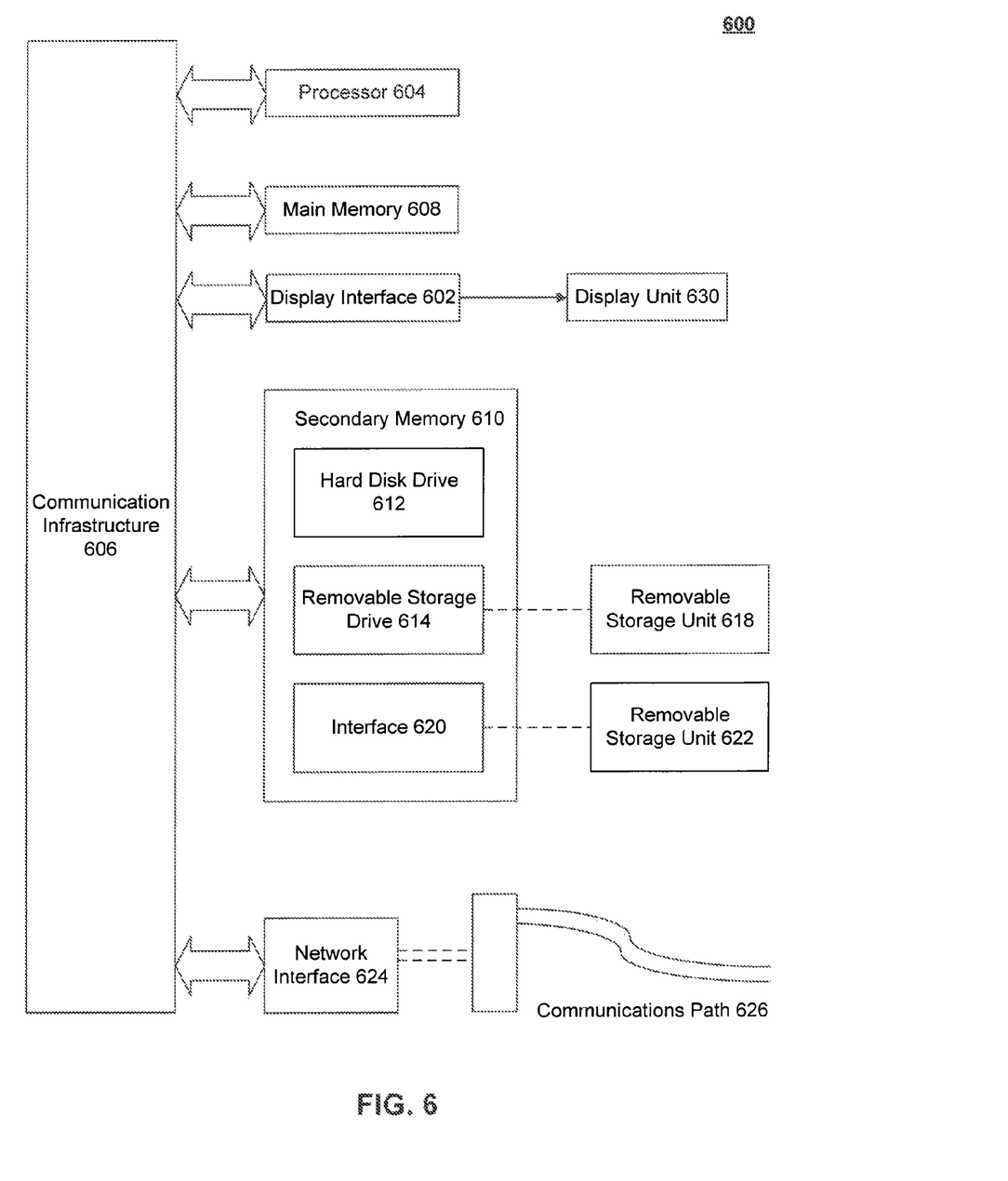
FIG. 6 is a diagram of an example computer system in which embodiments can be implemented.

FIG. 6 illustrates an example computer system 600 in which embodiments, or portions thereof, may be implemented as computer-readable code. For example, MFELPO 115, including its components, as shown in FIG. 2, can be implemented in computer system 600 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-5.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments are described in terms of this example computer system 600. After reading this description, it will become apparent to a person skilled in the relevant art how to implement embodiments of the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. As will be appreciated by persons skilled in the relevant art, processor device 604 may also be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme.

Computer system 600 also includes a main memory 608, for example, random access memory (RAM), and may also include a secondary memory 610. Secondary memory 610 may include, for example, a hard disk drive 612, removable storage drive 614. Removable storage drive 614 may comprise a floppy disk drive, a magnetic tape drive, an optical disk drive, a flash memory, or the like. The removable storage drive 614 reads from and/or writes to a removable storage unit 618 in a well-known manner. Removable storage unit 618 may comprise a floppy disk, magnetic tape, optical disk, etc. which is read by and written to by removable storage drive 614. As will be appreciated by persons skilled in the relevant art, removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 6600 may also include a network interface 624. Network interface 524 allows software and data to be transferred between computer system 600 and external devices. Network interface 624 may include a modem, a network interface (such as an Ethernet card), a communications port, a PCMCIA slot and card, or the like. Software and data transferred via network interface 624 may be in the form of signals, which may be electronic, electromagnetic, optical, or other signals capable of being received by network interface 624. These signals may be provided to network interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Computer program medium and computer usable medium may also refer to memories, such as main memory 608 and secondary memory 610, which may be memory semiconductors (e.g. DRAMs, etc.).

Computer programs (also called computer control logic) are stored in main memory 608 and/or secondary memory 610. Computer programs may also be received via network interface 624. Such computer programs, when executed, enable computer system 600 to implement embodiments as discussed herein. In particular, the computer programs, when executed, enable processor device 604 to implement the processes of embodiments of the present invention, such as the stages in the methods illustrated by flowchart 300 of FIG. 3, discussed above. Accordingly, such computer programs represent controllers of the computer system 600. Where embodiments are implemented using software, the software may be stored in a computer program product and loaded into computer system 600 using removable storage drive 614, interface 620, and hard disk drive 612, or network interface 624.

Embodiments of the invention also may be directed to computer program products comprising software stored on any computer useable medium. Such software, when executed in one or more data processing device(s), causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

Conclusion

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method for memory management, comprising:

creating a reference count for each sub block in a global memory block, wherein the global memory block includes a plurality of sub blocks aged based on respective allocation time;

incrementing a reference count for a first sub block when a thread operates on a collection of data items and accesses the first sub block for a first time;

maintaining a reference count for a second sub block, wherein the reference count for the second sub block is not updated when the thread operates on the collection of data items when accessing, the second sub block, and wherein the second sub block has an allocation time after that of the first sub block;

lazily updating reference counts for the first sub block and a third sub block when the thread returns with a new collection of data items and accesses the third sub block, different from the first sub block, wherein the reference count for the first sub block is decremented and the reference count for the third sub block is incremented; and freeing one or more sub blocks in the order of their age, wherein reference counts of the sub blocks to be freed are equal to zero.

2. The method of claim 1, wherein freeing further comprises:

scanning through the one or more sub blocks in the order of their age until encountering a sub block with a non-zero reference count.

3. The method of claim 2, further comprising:

scanning through the one or more sub blocks whose corresponding reference counts are equal to zero before the thread operates on the collection of data items.

4. The method of claim 2, further comprising:

aborting the scanning and proceeding with operating on the collection of data items if a first thread finds a second thread is in the process of freeing the one or more sub blocks.

5. The method of claim 1, farther comprising:

caching a reference to the first sub block in a local storage of the thread when the thread operates on the collection of data items and accesses the first sub block for the first time.

6. The method of claim 1, wherein lazily updating further comprises:

decrementing the reference count for the first sub block when the thread is destroyed.

7. The method of claim 1, wherein the reference count for the second sub block is not updated when the thread completes operating on the collection of data items and leaves the second sub block.

8. The method of claim 1, wherein access to the reference number for each sub block is synchronized using a lock.

9. A system for memory management, comprising:

a reference count creator, configured to create a reference count for each sub block in a global memory block, wherein the global memory block includes a plurality of sub blocks aged based on respective allocation time;

a reference count updater, configured to:

increment a reference count for a first sub block when a thread operates on a collection of data items and accesses the first sub block for a first time;

maintain a reference count for a second sub block, wherein the reference count for the second sub block is not updated when the thread operates on the collection of data items when accessing the second sub block, and wherein the second sub block has an allocation time after that of the first sub block; and lazily update reference counts for the first sub block and a second sub block when the thread returns with a new collection of data items and accesses the third sub block different from the first sub block, wherein the reference count for the first sub block is decremented and the reference count for the third sub block is incremented; and a block freer, configured to free one or more sub blocks in the order of their age, wherein reference counts of the sub blocks to be freed are equal to zero.

10. The system of claim 9, wherein the block freer is further configured to:

scan through the one or more sub blocks in the order of their age until encountering a sub block with a non-zero reference count.

11. The system of claim 10, wherein the block freer is further configured to:

scan through the one or more sub blocks Whose corresponding reference counts are equal to zero before the thread operates on the collection of data items.

12. The system of claim 10, wherein the block freer is further configured to:

abort the scanning and proceed with operating on the collection of data items if a first thread finds a second thread is in the process of freeing the one or more sub blocks.

13. The system of claim 9, further comprising:

a reference cacher, configured to cache a reference to the first sub block in a local storage of the thread when the thread operates on the collection of data items and accesses the first sub block for the first time.

14. The system of claim 9, wherein the reference count updater is further configured to:

decrement the reference count for the sub block which is cached in the local storage of the thread, when the thread is destroyed.

15. The system of claim 9, wherein the reference count for the second sub block is not updated when the thread completes operating on the collection of data items and leaves the second sub block.

16. The system of claim 9, wherein, access to the reference number for each sub block is synchronized using a lock.

17. A computer program product comprising a computer readable storage medium having instructions encoded thereon that, when executed by a processor, cause the processor to perform operations comprising:

creating a reference count for each sub block in a global memory block, wherein the global memory block includes a plurality of sub blocks aged based on respective allocation time;

incrementing a reference count for a first sub block when a thread operates on a collection of data items and accesses the first sub block for a first time;

maintaining a reference count for a second sub block, wherein the reference count for the second sub block is not updated when the thread operates on the collection of data items when accessing the second sub block, and wherein the second sub block has an allocation time after that of the first sub block;

lazily updating reference counts for the first sub block and a third sub block when the thread returns with a new collection of data items and accesses a third sub block different from the first sub block, wherein the reference count for the first sub block is decremented and the reference count for the third sub block is incremented; and freeing one or more sub blocks in the order of their age, wherein reference counts of the sub blocks to be freed are equal to zero.

18. The computer program product of claim 17, the freeing further comprising:

scanning through the one or more sub blocks in the order of their age until encountering a sub block with a non-zero reference count.

* * * * *